United States Patent
Koopman

(10) Patent No.: US 9,829,897 B2
(45) Date of Patent: Nov. 28, 2017

(54) SYSTEMS AND METHODS FOR CONTROLLING WATER HEATERS

(71) Applicant: Emerson Electric Co., St. Louis, MO (US)

(72) Inventor: Wayne A. Koopman, Red Bud, IL (US)

(73) Assignee: Emerson Electric Co., St. Louis, MO (US)

( * ) Notice: Subject to any disclaimer, the term of this patent is extended or adjusted under 35 U.S.C. 154(b) by 521 days.

(21) Appl. No.: 14/171,416

(22) Filed: Feb. 3, 2014

(65) Prior Publication Data

US 2015/0220091 A1   Aug. 6, 2015

(51) Int. Cl.
G05D 23/19 (2006.01)
F24H 1/20 (2006.01)
F24H 9/20 (2006.01)
F23N 1/08 (2006.01)

(52) U.S. Cl.
CPC ......... *G05D 23/1919* (2013.01); *F23N 1/082* (2013.01); *F24H 1/205* (2013.01); *F24H 9/2035* (2013.01); *F24D 2200/04* (2013.01)

(58) Field of Classification Search
CPC ... G05D 23/1919; F24H 1/205; F24H 9/2035; F23N 1/082; F24D 2200/04
See application file for complete search history.

(56) References Cited

U.S. PATENT DOCUMENTS

| | | |
|---|---|---|
| 5,660,328 A | 8/1997 | Momber |
| 6,560,409 B2 | 5/2003 | Troost, IV |
| 6,955,301 B2 | 10/2005 | Munsterhuis et al. |
| 7,590,470 B2 | 9/2009 | Caves et al. |
| 7,712,677 B1 | 5/2010 | Munsterhuis et al. |
| 7,798,107 B2 | 9/2010 | Chian et al. |
| 8,322,312 B2 | 12/2012 | Strand |
| 2010/0300377 A1 | 12/2010 | Buescher et al. |
| 2014/0070014 A1* | 3/2014 | Bohan ............... F24D 3/00 237/8 A |
| 2014/0241708 A1* | 8/2014 | Chaudhry ......... F24H 9/2021 392/454 |

* cited by examiner

Primary Examiner — Charles E Anya
(74) Attorney, Agent, or Firm — Armstrong Teasdale LLP

(57) ABSTRACT

A water heater includes a storage tank, a sensor configured to measure a temperature of water in the storage tank, a burner configured to heat the water in the storage tank, and a controller communicatively coupled to the sensor and the burner. The controller is configured to initiate a call for heat when the measured temperature reaches a trigger temperature, wherein the trigger temperature is a differential amount less than a set-point temperature, calculate a reduced activation time when the call for heat results in a predetermined number of calls for heat occurring within a predetermined time period, and control the burner based on the reduced activation time.

18 Claims, 5 Drawing Sheets

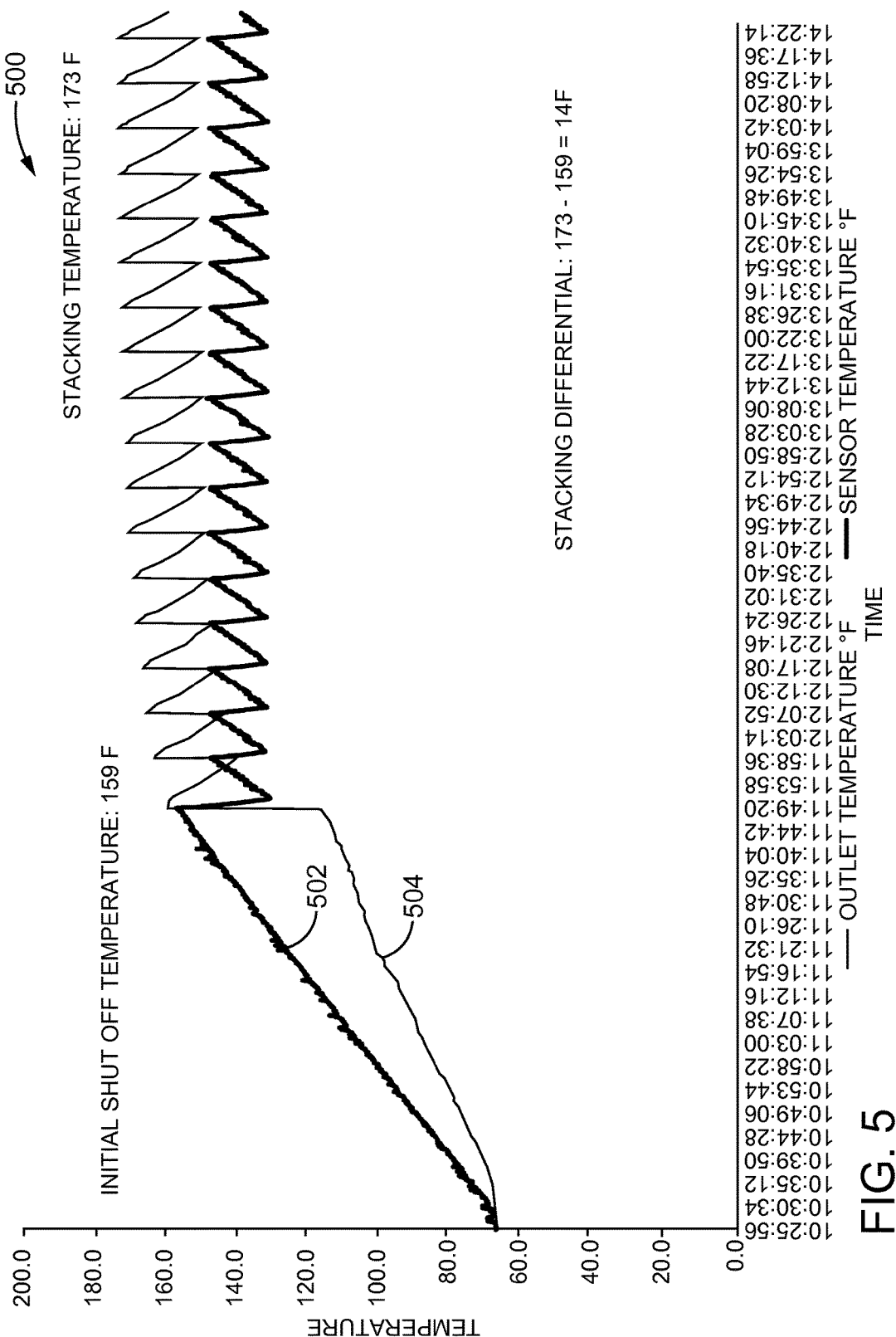

SYSTEMS AND METHODS FOR CONTROLLING WATER HEATERS

FIELD

The field of the disclosure relates generally to controlling water heaters, and more particularly, to controlling stacking in the water heater.

BACKGROUND

In a typical water heater, cold or ambient temperature water is introduced into the bottom of the water heater tank, where it is detected by a sensor that triggers a call for heat. When a water heater is subjected to repeated short draws of hot water in which the water draw stops shortly after a call for heat is initiated, the water temperature in the tank can stratify and lead to water at the top of the water heater being much hotter than the desired temperature setting. This phenomenon is also referred to as stacking.

Stacking can be reduced by implementing a relatively large temperature differential setting, such as 20° Fahrenheit (F.). That is, with a differential of 20° F., the water temperature as measured by the sensor must drop 20° below a water temperature set-point before a call for heat is initiated. However, over a few hours of inactivity, the water in the tank will cool and any hot water draws made before a call for heat is initiated may result in complaints that the water is too cold.

For example, where a hot water heater is set to 120° F., and the differential is set to 20° F., water in the tank may cool to 101° F. overnight such that any draw of hot water in the morning may be too cold. Thus, large differential settings may result in cold water complaints if the no hot water draws are made over an extended period of time. On the other hand, a narrower differential setting decreases energy efficiency and may cause stacking, as the water heater turns on more often as the water temperature drops over time. Thus, there is a need for control of a water heater that reduces stacking effects yet maintains a comfortable hot water temperature.

This Background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

In one aspect, a processor for a controller of a water heater is configured to receive an output from a sensor indicating a measured temperature of water in the water heater, initiate a call for heat when the measured temperature reaches a trigger temperature, wherein the trigger temperature is a differential amount less than a set-point temperature, calculate a reduced activation time when the call for heat results in a predetermined number of calls for heat occurring within a predetermined time period, and control, based on the reduced activation time, a burner that is configured to heat the water in the water heater.

In another aspect, a water heater includes a storage tank, a sensor configured to measure a temperature of water in the storage tank, a burner configured to heat the water in the storage tank, and a controller communicatively coupled to the sensor and the burner. The controller is configured to initiate a call for heat when the measured temperature reaches a trigger temperature, wherein the trigger temperature is a differential amount less than a set-point temperature, calculate a reduced activation time when the call for heat results in a predetermined number of calls for heat occurring within a predetermined time period, and control the burner based on the reduced activation time.

In yet another aspect, a method for operating a water heater using a controller is provided. The method includes receiving, at the controller, an output from a sensor indicating a measured temperature of water in the water heater, initiating, using the controller, a call for heat when the measured temperature reaches a trigger temperature, wherein the trigger temperature is a differential amount less than a set-point temperature, calculating, using the controller, a reduced activation time when the call for heat results in a predetermined number of calls for heat occurring within a predetermined time period, and controlling, using the controller, a burner based on the reduced activation time, the burner configured to heat the water in the water heater.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

FIG. 5 is a graph showing experimental results achieved when controlling a burner based on a reduced activation time.

DETAILED DESCRIPTION

Figure 1:
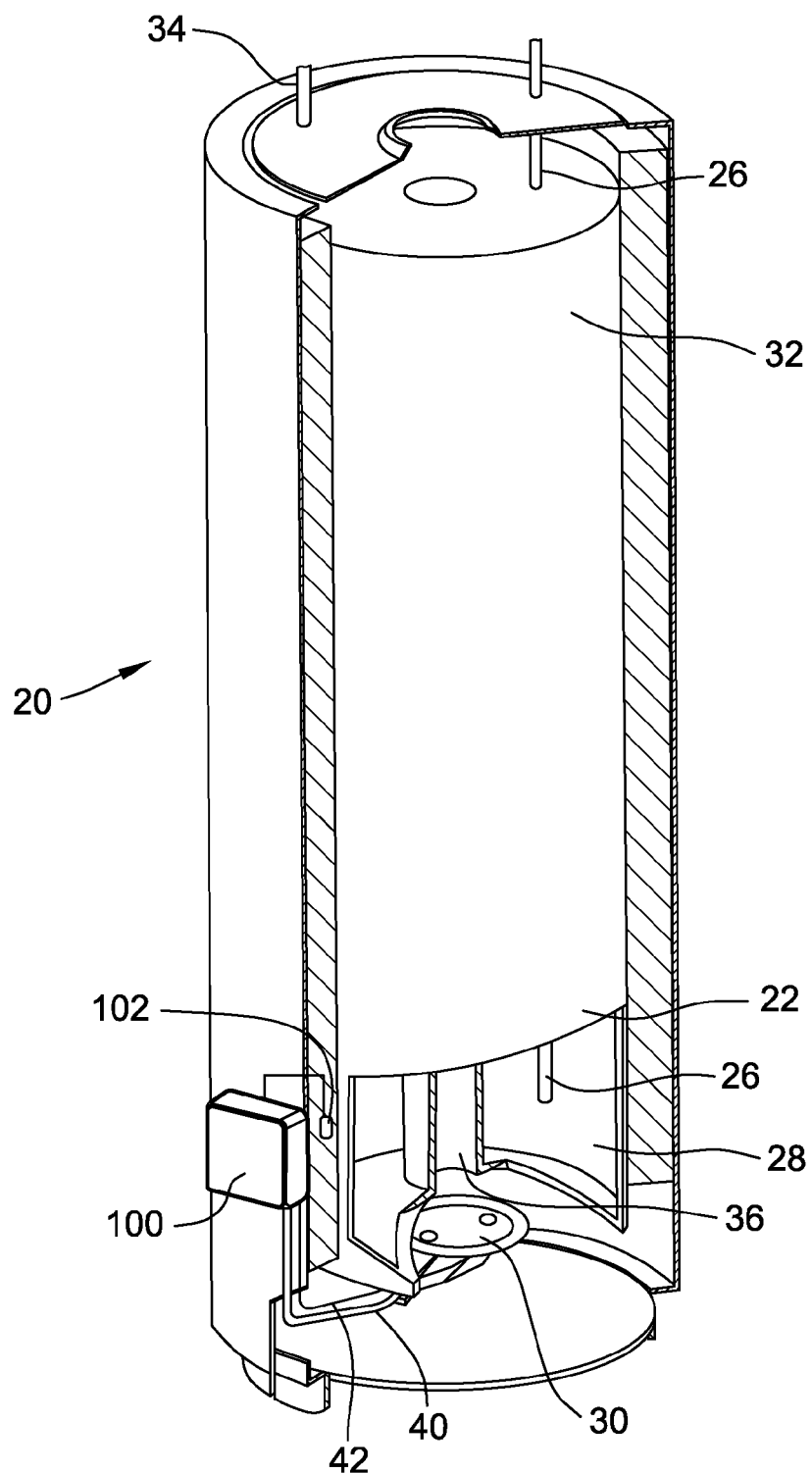
FIG. 1 is a cut-away view of a water heater including one embodiment of an apparatus for controlling operation of the water heater.

Referring to FIG. 1, an apparatus 100 is provided for controlling operation of a water heater 20 to maintain a desired temperature of water in the water heater 20. Water heater 20 has a storage tank 22 that stores heated water and receives cold water via a cold water inlet 26. Cold water entering a bottom portion 28 of storage tank 22 is heated by a fuel-fired burner 30 beneath storage tank 22. Water that is heated leaves storage tank 22 via a hot water outlet pipe 34. Combustion gases from burner 30 leave water heater 20 via a flue 36. Apparatus 100 provides for control of gas flow via a gas supply line 40 to burner 30, as described herein.

Apparatus 100 includes a sensor 102 that provides an output or value that is indicative of a sensed temperature of the water inside of storage tank 22. For example, sensor 102 may be a tank surface-mounted temperature sensor, such as a thermistor. Alternatively, in other embodiments, sensor 102 may be a temperature probe or any other sensor suitable for measuring the water temperature in storage tank 22. In the embodiment shown in FIG. 1, Sensor 102 is positioned proximate bottom portion 28 of storage tank 22, such that cold water entering storage tank 22 from cold water inlet 26 affects the output of sensor 102.

Apparatus 100 is positioned, for example, adjacent storage tank 22. Sensor 102 is in communication with apparatus 100, and provides apparatus 100 an output or value indicative of the water temperature in storage tank 22. In some embodiments, a second sensor (not shown) may be disposed at an upper portion 32 of the water heater 20, to provide an output or value that is indicative of a sensed temperature of the water in upper portion 32 of storage tank 22.

Figure 2:
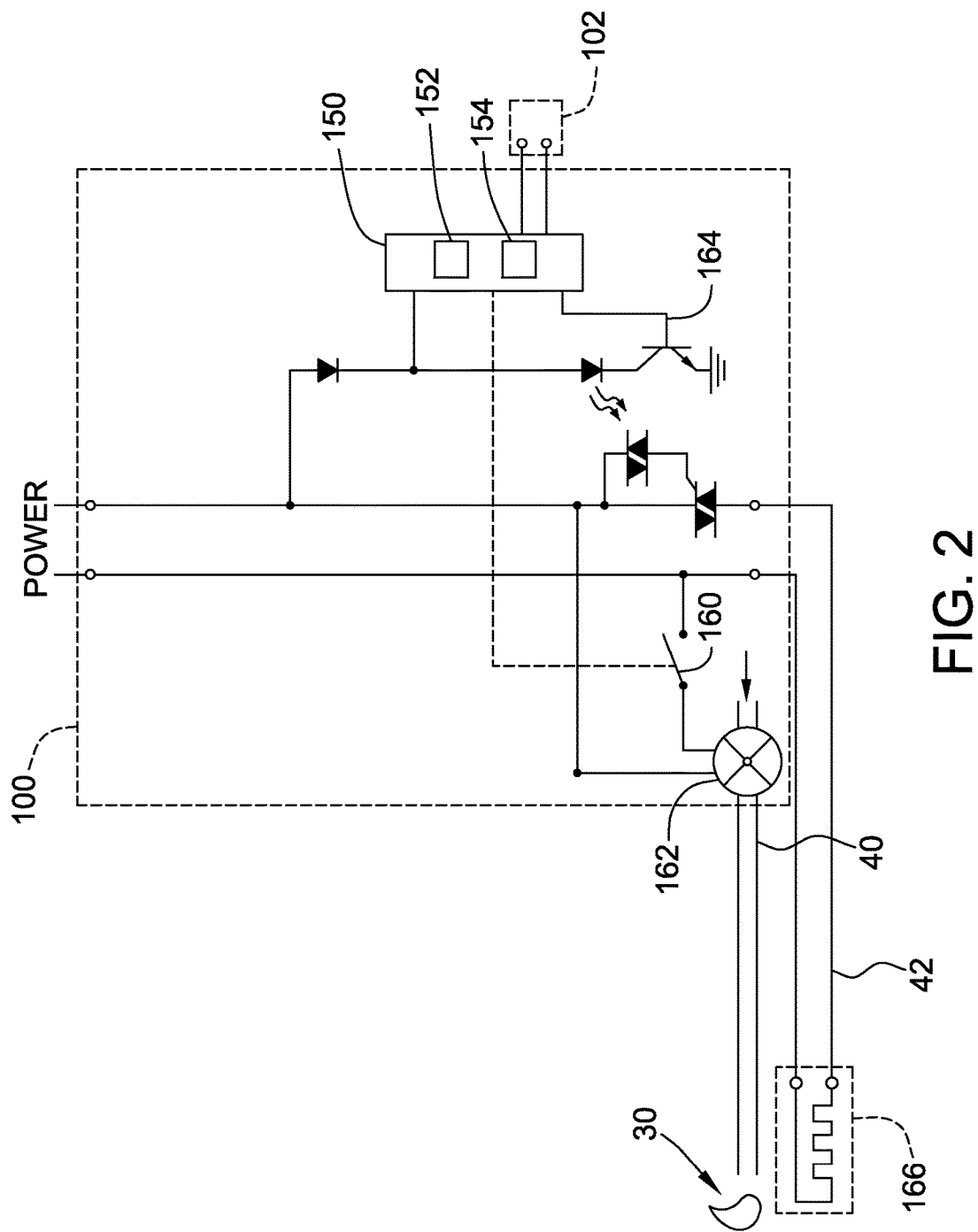
FIG. 2 is a schematic view of the apparatus shown in FIG. 1.

Referring to FIG. 2, a schematic is shown of apparatus 100 having a controller 150 that is communicatively coupled to sensor 102. Controller 150 includes a processor 152 and a memory device 154 in this embodiment. Processor 152 is communicatively coupled to sensor 102 and memory device 154. Processor 152 controls operation of controller 150, and accordingly, water heater 20, as described herein. Executable instructions are stored in memory device 154, and controller 150 performs one or more operations described herein by programming processor 152. For example, processor 152 may be programmed by encoding an operation as one or more executable instructions and by providing the executable instructions in memory device 154.

Processor 152 may include one or more processing units (e.g., in a multi-core configuration). Further, processor 152 may be implemented using one or more heterogeneous processor systems in which a main processor is present with secondary processors on a single chip. As another illustrative example, processor 152 may be a symmetric multi-processor system containing multiple processors of the same type. Further, processor 152 may be implemented using any suitable programmable circuit including one or more systems and microcontrollers, microprocessors, programmable logic controllers (PLCs), reduced instruction set circuits (RISC), application specific integrated circuits (ASIC), programmable logic circuits, field programmable gate arrays (FPGA), and any other circuit capable of executing the functions described herein. In this embodiment, processor 152 controls one or more characteristics of a call for heat, as described herein. As used herein, a 'call for heat' refers to a process that heats water stored in storage tank 22.

Memory device 154 includes one or more devices that enable information such as executable instructions and/or other data to be stored and retrieved. Memory device 154 may include one or more computer readable media, such as, without limitation, dynamic random access memory (DRAM), static random access memory (SRAM), non-volatile random access memory (NVRAM), a solid state disk, and/or a hard disk. Memory device 154 may be configured to store, without limitation, application source code, application object code, source code portions of interest, object code portions of interest, configuration data, execution events and/or any other type of data. In some embodiments, memory device 154 is part of processor 152.

Using processor 152, controller 150 controls at least one gas valve actuator 160 for operating a gas valve 162 to supply gas via supply line 40 to burner 30. In some embodiments, controller 150 may further operate an igniter actuator 164 for actuating an igniter 166 via a connection 42. Controller 150, and more specifically processor 152, monitors sensor 102 and the measured temperature of the water in storage tank 22, and controls operation of burner 30, as described herein.

Specifically, controller 150 facilitates and enables maintaining the temperature of water in storage tank 22 at a set-point temperature. For example, the set-point temperature may be 120° Fahrenheit (F). In this embodiment, when the temperature, as measured by sensor 102, drops to a trigger temperature (e.g., 110° F.), a call for heat is started, or initialized, and burner 30 is activated to heat the water. As used herein, the 'differential' refers to the temperature difference between the set-point temperature and the trigger temperature. For example, if the set-point temperature is 120° F. and the trigger temperature is 110° F., the differential is 10° F.

Under default operation, burner 30 is activated until the temperature, as measured by sensor 102, reaches the set-point temperature. However, as explained above, when multiple short draws of hot water are made, the water temperature in storage tank 22 may stratify, leading to water at upper portion 32 having a temperature significantly higher than the set-point temperature. Accordingly, in the embodiments described herein, when repeated calls for heat are made within a relatively short period of time, controller 150 reduces a period of time during which burner 30 is activated, as described herein.

Figure 3:
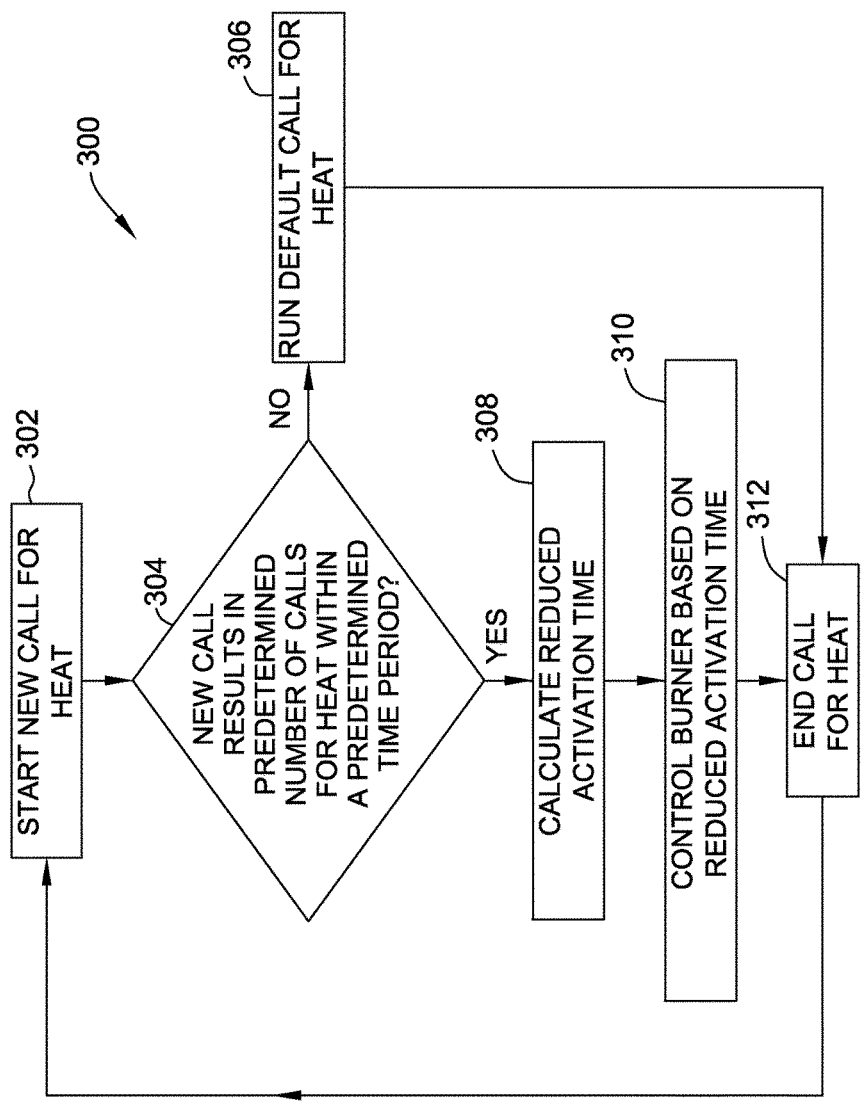
FIG. 3 is a flowchart of a method for use in controlling a water heater.

FIG. 3 is a flowchart of a method 300 for use in controlling a water heater, such as water heater 20 (shown in FIG. 1). Unless otherwise indicated, method 300 is performed by controller 150, and more specifically, processor 152. At step 302 of the method, a new call for heat is started, or initialized. Specifically, controller 150 determines that the water temperature measured by sensor 102 has reached the trigger temperature, and starts the call for heat in response.

At step 304, controller 150 determines whether the new call for heat results in a predetermined number of calls for heat within a predetermined time period. For example, controller 150 may determine if two calls for heat occur within a time period of one hour. That is, if the new call for heat occurs within one hour of the end of a previous call for heat, this condition would be satisfied. Although the predetermined number of calls for heat is two and the predetermined time period is one hour in the foregoing example, those of skill in the art will appreciate that the predetermined number of calls for heat and the predetermined time period may be any values that enable controller 150 to function as described herein. For example, the predetermined time period and/or predetermined number of calls for heat may be determined based on one or more characteristics (e.g., volume, height, etc.) of water heater 20. To facilitate determining whether a predetermined number of calls for heat occur within a predetermined time period, a timer is started when any previous calls for heat end. In another embodiment, the time at which any previous calls for heat ends may be stored, for example, in memory device 154.

If the new call for heat does not result in the predetermined number of calls for heat occurring within the predetermined time period, flow proceeds to step 306, and the call for heat is run as a default call for heat. Specifically, controller 150 activates burner 30 until the measured water temperature reaches the set-point temperature. If the new call for heat does result in the predetermined number of calls for heat occurring within the predetermined time period, flow proceeds to step 308, and controller 150 calculates a reduced activation time.

The reduced activation time may be calculated using a number of different techniques. In one embodiment, the reduced activation time is calculated by multiplying the differential by a scaling factor. Notably, while burner 30 is activated, the temperature of the water may increase by approximately 1° F. per minute. For example, if the differential is 10° F., it will take approximately 10 minutes to heat the water from the trigger temperature to the set-point temperature. Thus, multiplying the differential by a scaling factor provides a reduced activation time that heats the water to an intermediate temperature between the trigger temperature and the set-point temperature.

For example, with a scaling factor of 0.6 minutes and a differential of 10° F., the reduced activation time would be 6 minutes, resulting in a temperature increase of approximately 6° F. The scaling factor may be any value that enables apparatus 100 to function as described herein. For example, the scaling factor may be between 0.4 and 0.8 minutes, more specifically between 0.5 and 0.7 minutes, and even more specifically 0.6 minutes. In this embodiment, assuming the differential and scaling factor are fixed, the reduced activation time is a constant. Accordingly, to calculate the reduced activation time, controller may retrieve a previously calculated value for the reduced activation time from, for example, memory device 154.

In another embodiment, the reduced activation time is calculated as a predetermined percentage of an activation time for the previous call for heat. For example, if the predetermined percentage is 80%, and during the previous call for heat, burner 30 was activated for 10 minutes, the reduced activation time would be 8 minutes. The scaling factor may be any value that enables apparatus 100 to function as described herein. For example, the scaling factor may be between 70% and 90%, more specifically between 75% and 85%, and even more specifically 80%. The activation time for the previous call for heat may be the absolute activation time (i.e., the actual amount of time that burner 30 was activated) or an activation time after a threshold temperature is reached. The threshold temperature may be, for example, the trigger temperature or a buffer temperature that is 1° F. above the trigger temperature. The activation time for the previous call for heat may be stored, for example, on memory device 154.

When calculating the reduced activation time based on the activation time for the previous call for heat, the reduced activation time is a dynamic value, instead of a constant. For example, assume a previous call for heat has an activation time of 10 minutes, the predetermined percentage is 80%, and two new calls for heat are made within the predetermined time period. For the first new call for heat, the reduced activation time will be 8 minutes (i.e., 10 minutes*80%). However, for the second new call, the reduced activation time will be 6.4 minutes (i.e., 8 minutes*80%) because for the second new call, the activation time for the 'previous call' for heat is the 8 minute reduced activation time from the first new call. Accordingly, if multiple calls are started within a short time period, the reduced activation time will iteratively become smaller and smaller.

With the reduced activation time calculated (using, for example, any of the techniques described above), at step 310, controller 150 controls burner 30 based on the reduced activation time. In one embodiment, controller 150 activates burner 30 for the reduced activation time. In another embodiment, controller 150 activates burner 30 such that burner 30 remains activated for the reduced activation time once the measured temperature reaches the trigger temperature. For example, after detection of the measured temperature and before activation of burner 30, the temperature may fall a small amount below the trigger temperature. In yet another embodiment, controller 150 activates burner 30 such that burner 30 remains activated for the reduced activation time once the measured temperature reaches a buffer temperature. The buffer temperature may be greater than (e.g., 1° F. above) the trigger temperature, equal to the trigger temperature, or less than the trigger temperature. Notably, burner 30 is deactivated when the reduced activation time expires, not when the measured temperature reaches a predetermined temperature. Accordingly, burner 30 is deactivated based on time, not temperature.

Once controller deactivates burner 30 (i.e., after the reduced activation time expires in step 310 or the measured temperature reaches the set-point temperature in step 306), the call for heat ends at step 312. Once the measured temperature falls to the trigger temperature, the method 300 begins again at step 302.

By controlling burner 30 based on a reduced activation time, as described herein, controller 150 facilitates preventing stacking in water heater 20. Specifically, because burner 30 is activated for less than the default activation time (i.e., the time it takes to heat water from the trigger temperature to the set-point temperature) when a predetermined number of calls for heat occur within a predetermined time period, the measured temperature generally does not reach the set-point temperature. Accordingly, a temperature of water proximate bottom portion 28, and consequently, a temperature of water proximate upper portion 32, is reduced. Further, when a new call for heat does not result in the predetermined number of calls for heat occurring within a predetermined time period, and the chances of stacking occurring are reduced, controller 150 runs a 'default' call for heat.

Figure 4:
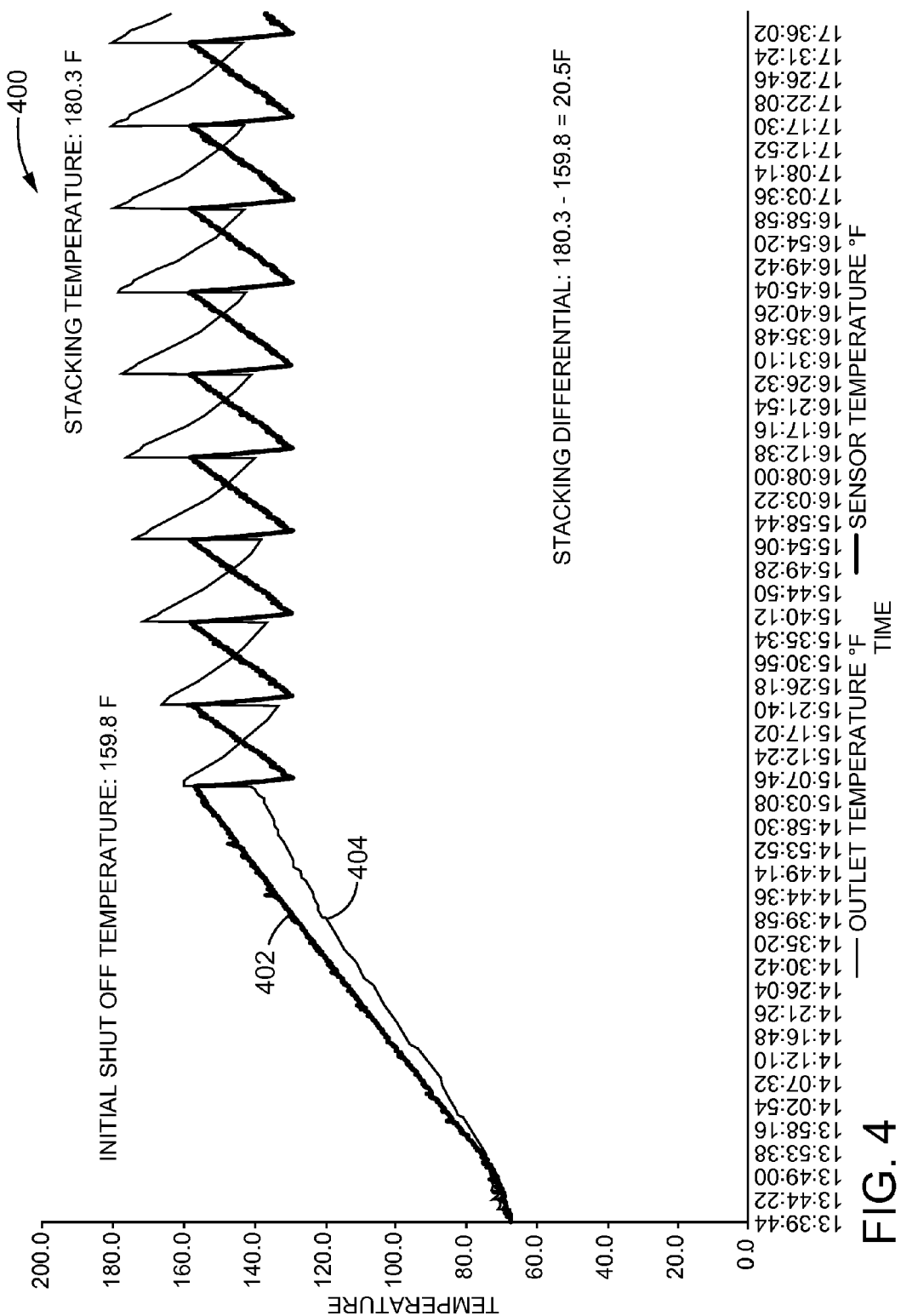
FIG. 4 is a graph showing experimental results achieved without controlling a burner based on a reduced activation time.

FIG. 4 is a graph 400 showing experimental results achieved without controlling burner 30 (shown in FIG. 1) based on a reduced activation time. FIG. 5 is a graph 500 showing experimental results achieved when controlling burner 30 based on a reduced activation time. To generate the results shown in graph 500, the reduced activation time was calculated by multiplying the differential by a scaling factor, as explained above.

Graph 400 includes a first curve 402 that plots the temperature measured at sensor 102 (shown in FIG. 1) versus time, and a second curve 404 that plots the temperature measured at hot water outlet pipe 34 (shown in FIG. 1). Similarly, graph 500 includes a first curve 502 that plots the temperature measured at sensor 102 versus time, and a second curve 504 that plots the temperature measured at hot water outlet pipe 34.

As shown in FIG. 4, when burner 30 is not controlled based on a reduced activation time, each time a call for heat is performed, burner 30 is activated until sensor 102 measures a set-point temperature of 159° F. However, as demonstrated by second curve 404, this causes the temperature at hot water outlet pipe 34 to gradually increase. Specifically, on graph 400, the temperature at hot water outlet 34 reaches 180.3° F., which is 20.5° F. above the set-point temperature.

In contrast, as shown in FIG. 5, when burner 30 is controlled based on a reduced activation time, subsequent calls for heat are shorter than the initial call for heat. Accordingly, the temperature at hot water outlet reaches 173° F., which is only 14° F. above the set-point temperature of 159° F. As such, FIGS. 4 and 5 demonstrate that the systems and methods described herein facilitate preventing stacking.

Embodiments of the methods and systems described herein achieve superior results compared to prior methods and systems. For example, unlike at least some known water heater systems, when a predetermined number of calls for heat occur within a predetermined time period, a burner is controlled based on a reduced activation time. Operating the burner based on the reduced activation time facilitates reducing the stratification of temperatures in the water heater and preventing stacking in the water heater, providing more control over stacking. Moreover, the systems and methods described herein may be less expensive to implement than at least some known water heater control systems.

Example embodiments of systems and methods for controlling a water heater are described above in detail. The system is not limited to the specific embodiments described herein, but rather, components of the system may be used independently and separately from other components described herein. For example, the controller and processor described herein may also be used in combination with other systems and methods, and are not limited to practice with only the system as described herein.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing(s) shall be interpreted as illustrative and not in a limiting sense.

What is claimed is:

1. A processor for a controller of a water heater, the processor programmed with instructions such that when the instructions are executed, the processor is configured to:
   receive an output from a sensor indicating a measured temperature of water in the water heater;
   initiate a call for heat when the measured temperature reaches a trigger temperature, wherein the trigger temperature is a differential amount less than a set-point temperature;
   calculate a reduced activation time when the call for heat results in a predetermined number of calls for heat occurring within a predetermined time period, wherein the reduced activation time is calculated based on a predetermined scaling factor and wherein the reduced activation time is less than a standard activation time required to heat the water from the trigger temperature to the set-point temperature; and
   control, based on the reduced activation time, a burner that is configured to heat the water in the water heater.

2. The processor of claim 1, wherein the processor is configured to calculate the reduced activation time as the differential amount multiplied by the predetermined scaling factor.

3. The processor of claim 1, wherein the processor is configured to calculate the reduced activation time as a predetermined percentage of an activation time for a previous call for heat.

4. The processor of claim 1, wherein the processor is further configured to activate the burner until the measured temperature reaches the set-point temperature when the call for heat does not result in the predetermined number of calls for heat occurring within the predetermined time period, and wherein the predetermined number of calls for heat is two.

5. The processor of claim 1, wherein the processor is configured to control the burner such that the burner is activated for the reduced activation time.

6. The processor of claim 1, wherein the processor is configured to control the burner such that the burner remains activated for the reduced activation time once the measured temperature reaches the trigger temperature.

7. The processor of claim 1, wherein the processor is configured to control the burner such that the burner remains activated for the reduced activation time once the measured temperature reaches a predetermined buffer temperature.

8. A water heater comprising:
   a storage tank;
   a sensor configured to measure a temperature of water in the storage tank; a burner configured to heat the water in the storage tank; and
   a controller communicatively coupled to the sensor and the burner, the controller configured to:
   initiate a call for heat when the measured temperature reaches a trigger temperature, wherein the trigger temperature is a differential amount less than a set-point temperature;
   calculate a reduced activation time when the call for heat results in a predetermined number of calls for heat occurring within a predetermined time period, wherein the reduced activation time is calculated based on a predetermined scaling factor and wherein the reduced activation time is less than a standard activation time required to heat the water from the trigger temperature to the set-point temperature; and
   control the burner based on the reduced activation time.

9. The water heater of claim 8, wherein the controller is configured to calculate the reduced activation time as the differential amount multiplied by the predetermined scaling factor.

10. The water heater of claim 8, wherein the controller is configured to calculate the reduced activation time as a predetermined percentage of an activation time for a previous call for heat.

11. The water heater of claim 8, wherein the controller is further configured to activate the burner until the measured temperature reaches the set-point temperature when the call for heat does not result in the predetermined number of calls for heat occurring within the predetermined time period.

12. The water heater of claim 8, wherein the controller is configured to control the burner such that the burner is activated for the reduced activation time.

13. The water heater of claim 8, wherein the controller is configured to control the burner such that the burner remains activated for the reduced activation time once the measured temperature reaches the trigger temperature.

14. The water heater of claim 8, wherein the controller is configured to control the burner such that the burner remains activated for the reduced activation time once the measured temperature reaches a predetermined buffer temperature.

15. A method for operating a water heater using a controller, the method comprising:
   receiving, at the controller, an output from a sensor indicating a measured temperature of water in the water heater;
   initiating, using the controller, a call for heat when the measured temperature reaches a trigger temperature, wherein the trigger temperature is a differential amount less than a set-point temperature;
   calculating, using the controller, a reduced activation time when the call for heat results in a predetermined number of calls for heat occurring within a predetermined time period, wherein calculating the reduced activation time comprises calculating the reduced activation time as the differential amount multiplied by a predetermined scaling factor; and controlling, using the controller, a burner based on the reduced activation time, the burner configured to heat the water in the water heater.

16. The method of claim 15, wherein controlling a burner comprises controlling the burner such that the burner is activated for the reduced activation time.

17. The method of claim 15, wherein controlling a burner comprises controlling the burner such that the burner remains activated for the reduced activation time once the measured temperature reaches the trigger temperature.

18. The method of claim 15, wherein controlling a burner comprises controlling the burner such that the burner remains activated for the reduced activation time once the measured temperature reaches a predetermined buffer temperature.

* * * * *